United States Patent

D'Alelio

[11] 4,000,358
[45] Dec. 28, 1976

[54] UNSATURATED ESTER-AMIDES OF HALOGENATED ALKENES

[76] Inventor: Gaetano F. D'Alelio, 2011 E. Cedar St., South Bend, Ind. 46617

[22] Filed: Jan. 5, 1976

[21] Appl. No.: 646,642

Related U.S. Application Data

[60] Division of Ser. No. 432,851, Jan. 14, 1974, Pat. No. 3,950,392, which is a continuation-in-part of Ser. No. 198,949, Nov. 15, 1971, Pat. No. 3,823,183, which is a division of Ser. No. 785,336, Dec. 19, 1968, Pat. No. 3,637,813.

[52] U.S. Cl. .................. 526/292; 204/159.22; 260/899; 428/483; 428/500; 428/507; 428/514; 526/230; 526/232; 526/261
[51] Int. Cl.² ........................... C08F 118/16
[58] Field of Search ...................... 526/292

[56] References Cited

UNITED STATES PATENTS 2,847,455  8/1958  Steadman .................. 260/482

Primary Examiner—Harry Wong, Jr.
Attorney, Agent, or Firm—Walter J. Monacelli

[57] ABSTRACT

This invention deals with new unsaturated esteramides of $\alpha,\beta$-unsaturated polycarboxylic acids derived from halogenated alcohols of the formula

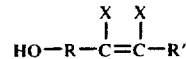

wherein R is a divalent hydrocarbon moiety having at least one and no more than 10 carbon atoms, X is a member selected from the class of bromine and chlorine, and R' is a member selected from the class of hydrogen, X and a monovalent hydrocarbon containing at least one and no more than 20 carbon atoms. Typical esteramides are the maleates, fumarates, itaconates and citraconates. These monomers possess fire-retardant properties and are useful for the synthesis of polymers and copolymers.

5 Claims, No Drawings

UNSATURATED ESTER-AMIDES OF HALOGENATED ALKENES

This is a division of application Ser. No. 432,851 filed Jan. 14, 1974, now U.S. Pat. No. 3,950,392, which is a continuation-in-part of copending application Ser. No. 198,949 filed Nov. 15, 1971, now U.S. Pat. No. 3,823,183, which is a division of application Ser. No. 785,336, filed Dec. 19, 1968, issued Jan. 25, 1972, as U.S. Pat. No. 3,637,813.

RELATED PRIOR ART

No pertinent prior art is known. The closest related prior art are the polymers containing pendant halogenated acetylenic groups which are disclosed in J. Polymer Sci., Vol. 5, pp. 813–832, pp. 999–1014 and pp. 1245–1264, (1967). However this publication does not show monomers which possess a free vinyl group and a polyhalogenated ethylenic group.

BACKGROUND OF THE INVENTION

This invention involves unsaturated carboxylic acid ester-amides which contain halogen atoms in their structures. In general, it concerns polycarboxylic acid ester-amides of polyhalogenated alcohols. In particular, it deals with α,β-unsaturated polycarboxylic acid ester-amides of halogenated alcohols of the formula $$HO-R-\overset{X}{C}=\overset{X}{C}-R$$
(A)

wherein
R is a divalent hydrocarbon containing at least 1 and no more than 10 carbon atoms,
X is bromine or chlorine, and
R' is H, X or a monovalent hydrocarbon containing at least 1 and no more than 20 carbon atoms.

Typical ester-amides of this invention are the maleates, the fumarates, the itaconates, the aconitates, etc. These typical ester-amides are derivatives of α,β-unsaturated polycarboxylic acids, all of which contain the essential structure

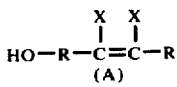
—C=C—COOH, (C).

By designating the halogenated alcohols (A) shown above as ZOH, the new ester-amides of this invention can be represented as containing the essential structure (C):

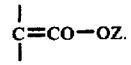
C=CO—OZ.

A few typical polycarboxylic acids from which the essential structure (C) can be derived are HOOC—CH=CH—COOH,

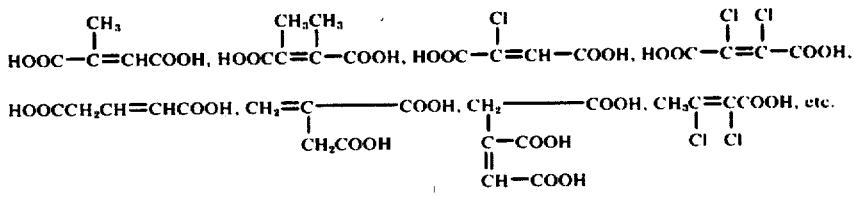

The α,β-polyunsaturated carboxylic acid may also be defined as having the structure,

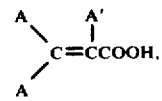
C=CCOOH, wherein A and A' are each selected from the class consisting of —H, —X, —CN, —COOZ, —(CR'$_2$)$_n$COOZ, and R', where at least one A or A' has a —COOZ group therein, preferably at least one A or A' representing H or X; n has a numerical value of 1 to 10; and Z is a radical selected from the class of H and $$-R\overset{X}{C}=\overset{X}{C}R'.$$

The ester-amides of this invention are readily prepared by esterifying the acids

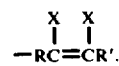
C=CCOOH with the alcohol R'CX=CXR—OH by procedures well known in the art. Instead of the carboxylic acid, the corresponding acid chloride or anhydride may be used. When the acid chloride is used, preferably, a hydrohalide acceptor such as a tertiary amine, as for example, the trialkyl amines, dimethylaniline, pyridine, etc., are used in the reaction:

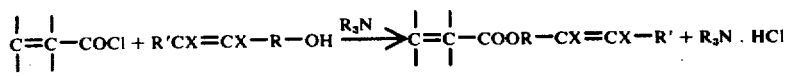

The ester exchange reaction, using the lower alkyl esters of the above acid, for example

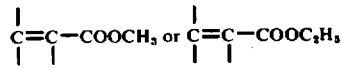

and the alcohol may be used to prepare the new esters of this invention, thus:

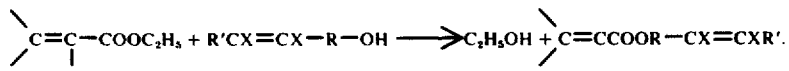

The amide group in the ester-amides of this invention are introduced by ordinary amidification reactions either before or after the introduction of the halogenated ester group shown above. This may be done with either a free acid group of the polycarboxylic acid or its half ester, or with the acid group converted to the acid halide, by reaction with ammonia or the appropriate amine to give the desired amide group.

The amide groups may be represented by the formula —CON(R'')$_2$ wherein R'' includes the groups included in R' as defined above but preferably is an alkyl, alkenyl aryl or cycloalkyl group of 1–10 carbon atoms. The R'' may also have an hydroxy or amino group attached such as in ethanol and diethanolamines, p-aminophenylamine, etc.

Typical divalent hydrocarbon radicals represented by R include:

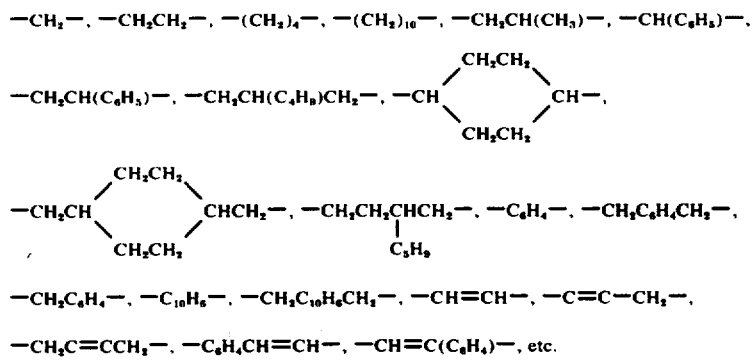

The new ester-amides of this invention are useful with their halogen content as flame retardants and for the preparation of flame-retardant compositions. Those ester-amides which contain an activated terminal vinyl or vinylidene group,

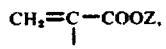

such as the itaconates, are particularly useful for the preparation of homopolymers and copolymers with other vinyl monomers, including other esters of this invention. Other ester-amides of α,β-unsaturated dicarboxylic esters, such as the maleates and fumarates, are particularly useful for the synthesis of copolymers. The esters of this invention find utility not only as monomers but also as plasticizers and fire-retardant additives to other non-polymeric as well as polymeric materials. Especially are they suited, as vinyl monomers, alone or with other monomers, for co-reaction with other unsaturated polyesters, typical examples of which are the polyalkylene maleates and fumarates, as well as those unsaturated polyesters modified by non-olefinic polycarboxylic acids such as phthalic, tetrachlorophthalic, tetrabromophthalic or chlorendic anhydride.

The polymerizable monomers of this invention, as illustrated, for example, by the itaconates, etc., are readily polymerized or copolymerized to soluble polymers by radical generating initiators, such as the peroxides, hydroperoxides, peracetates or by redox systems including hydrogen peroxide with ferrous salts or sodium bisulfite, potassium or sodium persulfate with bisulfate, etc.; ultraviolet light, ionizing radiation, etc. Radical polymerizations are well known in polymer science and are applicable to the monomers of this invention.

The production of soluble polymers, especially from the new ester-amides containing more than one double bond, particularly those having the structure

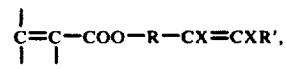

for example, NH$_2$C(O)CH$_2$=CHCOOCH$_2$CX=CHX, is surprising and unexpected since the corresponding allyl esters, CH$_2$=CHCOOCH$_2$CH=CH$_2$, and the acetylenic esters, CH$_2$=CHCOOCH$_2$≡CH, cross-link under radical polymerization as shown in J. Polymer Science, Vol. 5, pp. 323–337, 813–832, 999–1014 (1967). These monomers also differ from the corresponding allyl and acetylenic esters in that they do not polymerize with anionic initiators, since the halogen atoms in the new esters of this invention destroy the anionic initiator used. Further, these new ester-amides cannot be prepared directly from the acetylenic ester by halogenation, since the halogenation is not selective and causes halogenation, to a great degree, of the vinyl bond in the acid, thus

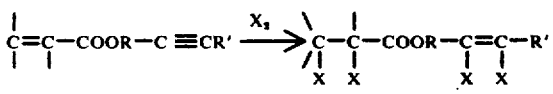

thereby destroying the polymerizability of the original

Some of the polymers obtained by the radical initiation of certain ester-amides of this invention, such as

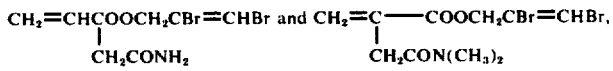

yield polymers having, at least in part, repeating units of the formula

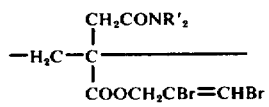

which repeating units are similar to those obtained by the post-halogenation of the completely linear polymers obtained by the anionic polymerization of the acetylenic esters of the acrylic acids, as shown in J. Polymer Sci., Vol. 5, pp. 813–832, 999–1014 (1967). However, the related polymers of this invention, prepared by radical polymerization are not entirely linear polymers, but, as a result of the well-known radical-transfer phenomenon, particularly in systems comprising halogenated compounds, are branched polymers. This is particularly advantageous when the polymer is intended for use as a fire-retardant additive, since the solution and melt viscosities of branched polymers are notably lower than the related linear polymers of the same molecular weight. This lower viscosity increases the compatibility of the polymers with other polymers, and allows the use of lower temperatures in processing the polymers or mixtures of polymers. Many of the polymers prepared from the monomers of this invention, however, have no relation to the post-halogenated acetylenic ester polymers mentioned hereinabove. For example, the itaconic ester-amide polymers, and the copolymers of the maleic or fumaric ester-amides are readily prepared by the radical initiation of the monomers of this invention, whereas the ester-amides of itaconic acid, fumaric acid and maleic acid, etc., cannot be polymerized anionically, and thus are unavailable for post-halogenation.

Another major advantage accrues from the use of many of the monomers of this invention, particularly with the ester-amides of the α,β-unsaturated polycarboxylic acid such as the itaconates, maleates, fumarates, citraconates, etc. The only requirement of the ester-amides of this invention is that at least one of the carboxyl groups of said polycarboxylic acid is esterfied by the alcohol, R'—CX=CXR—OH; the remaining one or more carboxyl groups may be converted to one or more amide groups, saturated or unsaturated, such as amides of ammonia, primary amines and secondary amines, such as methylamine, diethylamine, diethanolamine, cyclohexylamine, allylamine, diallylamine, aniline, N-methyl aniline, p-aminophenol, m-aminobenzoic acid, anthranilic acid, etc.

Where there is a third carboxylic acid group, such as in aconitic acid this third carboxylic acid group may be converted to an unsaturated ester or amide such as the vinyl, allyl, methallyl, crotyl ester, etc., in which case the new derivative can be polymerized to insoluble, infusible polymers. This third carboxylic acid group thus may be reacted with a saturated, unsaturated, carbocyclic or heterocyclic alcohol or amine, as for example, methyl, ethyl, propyl, amyl, hexyl, stearyl, benzyl, allyl, propargyl, butynyl, β-N,N-dimethylaminoethyl, cyclohexyl alcohols and amines, etc., such as β-hydroxyethyl alcohol or amine, β-hydroxypropyl alcohol or amine, β-hydroxyethyl alcohol or amine, dimethylamine, diethylamine, dipropyl amine, dibenzyl amine, diphenylamine, dicyclohexyl amine, etc.

A few examples of such typical monomers which polymerize to insoluble, infusible polymers are

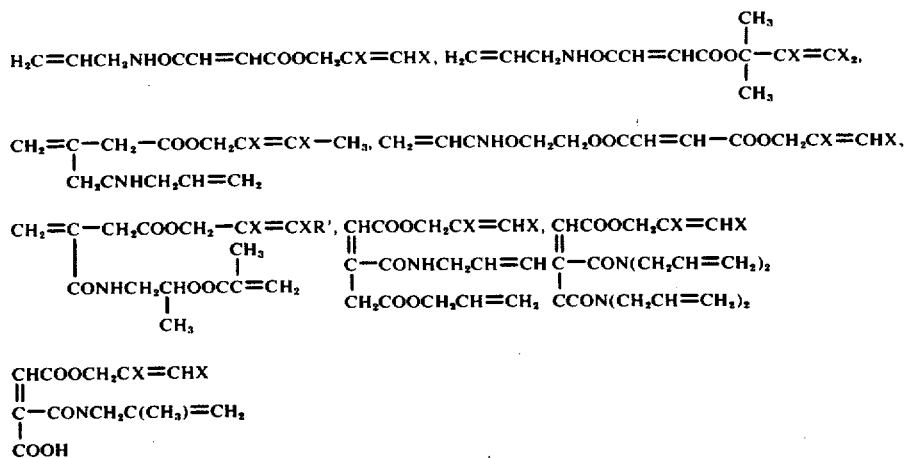

The monomers of this invention containing a

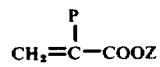

wherein P represents hydrogen, methyl, chlorine, bromine, cyano and phenyl, homopolymerize readily with radical initiation such as by means of a peroxy compound, ultraviolet light or ionizing radiation, whereas those monomers having substitution on the alpha and beta carbon atoms homopolymerize under radical initiation less readily and in some cases not at all, but copolymerize more readily according to their reactivity and selective constants, $r_1$ and $r_2$.

With unsymmetrical dibasic and tribasic acids, such as itaconic and aconitic acids, the exact positioning of the amide group with respect to the two or more carboxylic acid groups, and likewise the positioning of the ester group is difficult to determine and very likely the products are a mixture of the various possible positional isomers. Therefore, while a particular formula may be used to represent the product, such as for an ester-amide of itaconic acid,

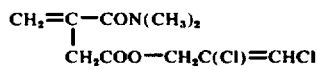

it is understood that a substantial part of the compound and even a major portion may actually have the isomeric formula

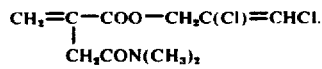

The homopolymerizations and copolymerizations of the monomers of this invention may be performed (1) in mass, that is, neat, in the absence of added solvents or dispersion media; (2) in suitable organic substances which are solvents for the monomers as well as the polymers, or which are solvents for the monomers and not for the polymers, in which cases the polymers precipitate from the media; or (3) in emulsion systems which are well known in the art and which comprise an emulsifying agent such as soaps, synthetic emulsifiers, such as dodecylbenzene sulfonate sodium salts, sodium sulfodioctylsuccinate and the like, in water. In the emulsion systems water soluble radical initiators such as potassium persulfate, hydrogen peroxide, sodium perborate, urea peroxide, etc., are used alone or in the presence of a redox agent, such as sulfur dioxide, sodium bisulfite, ferrous sulfate, etc.

Thus, the polymers and copolymers of this invention can be prepared by the vinyl type polymerization by means of radical initiators such as the peroxy and azo catalysts as such or as redox systems as well as by ultraviolet and ionizing radiation. Of the azo-type catalysts, azobisisobutyronitrile is a typical example and is usually preferred. The peroxy catalysts are illustrated by stearoyl, lauroyl and butyroyl peroxide, but for economic reasons benzoyl peroxide, tertiarybutyl peroxide and tertiary-butyl peracetate are preferred, but, any of the other well known peroxy catalysts such as cumene peroxide and the like can also be used.

In the polymers and copolymers derived from the monomers of this invention, the repeating unit structure derived from these monomers are represented as follows:

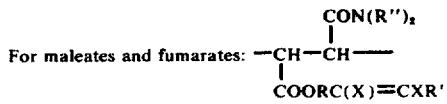

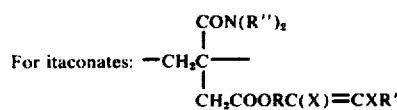

Alternately, the polymerization may be achieved thermally, simply by heating to generate the initiating radicals. The polymerization can be performed over a wide range of temperatures depending upon whether the system used is a mass, a solution or an emulsion polymerization and whether the initiation is by a redox system, ultraviolet or ionizing radiation. With ionizing radiation, polymerization can be achieved at temperatures as low as −40° C., but usually at ambient temperatures. The redox polymerizations can be performed at 0° to 70° C., and the thermal polymerizations can be performed up to temperatures of the order of 75° to 125° C. or higher.

The new monomers of this invention can be copolymerized with other vinyl monomers such as acrylic and methacrylic esters such as the methyl, ethyl, propyl, butyl, hexyl, cyclohexyl, dodecyl, etc. esters. In addition to, or in lieu of these acrylic type esters used in such copolymerizations, any other copolymerizable monovinyl or monovinylidene comonomer or mixtures thereof can be used, for example, vinyl esters, that is vinyl acetate, and the monovinyl esters of saturated and unsaturated, aliphatic, monobasic and polybasic acids: propionic, isobutyric, valeric, caprylic, caproic, oleic, stearic, acrylic, methacrylic, crotonic, oxalic, malonic, succinic, glutaric, adipic, suberic, azelaic, maleic, fumaric, itaconic, mesaconic, hexahydrobenzoic, citric, trimesic, etc., as well as the corresponding allyl, methallyl, etc. esters of the aforementioned acids, acrylonitrile, methacrylonitrile, methacrylic acid, hydroxy propyl methacrylate, etc.; amides such as acrylic amide; itaconic acid monoesters and diesters, such as the methyl, ethyl, butyl, allyl esters, the maleic and fumaric acid monoesters, diesters and their amide and nitrile compounds, such as diethyl maleate, maleyl diamide, itaconamide, fumaryl dinitrils, dimethyl fumarate, etc.; ethers, such as methallyl ethyl ether, vinyl ethyl ether, vinyl butyl ether, allyl propyl ether, vinyl cyclohexyl ether; cyanuric acid derivatives having one copolymerizable unsaturated group attached directly or indirectly to the triazine ring, such as allyl diethyl cyanurate, vinyl diethyl cyanurate; the dienes such as butadiene, isoprene, etc.; as well as the partial, soluble or fusible polymerizable polymers of the hereinabove listed monomers, etc.

Typical suitable aromatic comonomers include vinyl aryl compounds such as styrene, vinyl naphthalene, vinyl toluene, vinyl xylene, vinyl phenol, vinyl ethyl benzene, vinyl dimethyl naphthalene, vinyl diphenyl, etc.; chloro-styrenes, etc., vinyl phenyl ether, vinyl benzoate, vinyl naphthoate, vinyl methyl phthalate, allyl ethyl phthalate, allyl propyl phthalate, etc.

The polymeric compositions of this invention are particularly useful as coating compositions on all types of substrates, including cellulose in its various forms, such as paper, wood, paper board, wood board, wood pulp, regenerated cellulose in film or fiber form, laminates of various types including those prepared from fibrous fillers bonded with urea, melamine, epoxy and polyester resins, plaster board, concrete in its various forms such as slabs, blocks and the like. They may also be used as impregnants for porous bodies such as the compositions hereinabove named, as well as for synthetic and natural sponges, etc.

Particularly do they find use as bonding agents and adhesives for solid, porous and foamed bodies. They can be used alone or admixed with each other or with other copolymerizable monomers, unsaturated or saturated polymers, in the absence or presence of dyes, pigments, plasticizers. For coating, impregnating or adhesive compositions where the presence of small amounts of solvent in the cured composition is not objectionable they can be mixed with volatile or nonvolatile solvents best suited to the particular application.

The polymers of this invention are also useful in the preparation of copolymers with unsaturated alkyd resins. In carrying this portion of the invention into effect, an esterification product of a polyhydric alcohol and an alpha, alpha-unsaturated polycarboxylic acid is first prepared in accordance with techniques now well known to those skilled in the alkyd resin art, such as ethylene glycol maleate, propylene glycol maleate, ethylene glycol maleate-phthalate, ethylene glycol maleate-acrylate, propylene glycol-fumaratemethacrylate and the like.

In many cases, instead of copolymerizing a single monomer of this invention with a single alkyd resin, mixtures can be used of two or more such monomers with a single alkyd resin, or a single monomer can be used with two or more alkyd resins, or a mixture of two or more monomers with two or more alkyd resins.

The polymers of this invention can be used alone or with fillers, dyes, pigments, opacifiers, lubricants, plasticizers, natural and synthetic resins or other modifying bodies in, for example, casting, molding, laminating, coating applications, and as adhesives, impregnants, and protective coatings.

In preparing copolymers, the monomers of this invention can constitute as much as 98 to 99.5% by weight of the whole, or the modifying comonomer or alkyd resin can constitute 98 to 99.5% of the whole.

In general, the proportions of the components used in a particular formulation will depend upon the particular properties desired in the interpolymer. For most applications, it is preferred to use 20 to 80 percent of the monomers of this invention and from 80 to 20 percent of the modifying polymer or monomer, since within these ranges interpolymers best adapted for most commercial applications can be produced.

Within these ranges the new interpolymers have a wide range of properties. For example, depending upon the particular crosslinking polymer and any modifying polymer or monomer, the particular proportions thereof, the conditions of polymerization, such as the temperature, pressure, presence or absence of additives, etc., and the extent of polymerization, they can vary from soft flexible bodies to hard rigid masses of varying resistance to solvents.

For coating or impregnating applications where the presence of a small amount of solvent in the cured composition is not objectionable, the mixed starting component can be diluted with volatile or non-volatile solvents or diluents best suited for the particular service application, and then can be polymerized after the application of the solution to the particular article to be coated or impregnated, or impregnated and coated. By suitable selection of the starting material and the conditions of interpolymerization, interpolymers can be obtained in an insoluble, infusible state practically resistant to the destructive effect of other chemical bodies, such as acid, bases, salts, solvents, swelling agents, and the like.

When it is desired to modify the properties of the crosslinkable monomers of this invention, this can be accomplished by copolymerizing a mixture comprising at least one such polymer with at least one copolymerizable monomer containing at least one unsaturated ethylenic, or acetylenic hydrocarbon radical, more particularly, a $CH_2=C<$ radical, such as vinyl, allyl, methallyl, vinylidene, etc., or with a copolymerizable compound containing a $—CH=CH—$, or a $—CH=C<$, or a $>C=C<$ grouping, for example as in vinylidene fluoride, vinylidene cyanide, vinyl propionate, maleic anhydride, or its esters and amides, methyl maleic anhydride, tetrafluoroethylene, etc.

In preparing copolymers of the crosslinkable monomers with polymerizable comonomers such as methyl methacrylate, styrene, acrylonitrile, and the like, the crosslinkable polymer can constitute as little as 0.1 percent by weight of the whole, whereas in other cases the crosslinkable polymers can constitute as much as 98 to 99 percent of the whole. The proportion of the components in a particular formulation will depend upon the particular comonomers used and the particular properties desired in the copolymer. The polymers and copolymers can be prepared most readily by ionizing radiation.

Certain monomers of this invention, particularly those having the structure

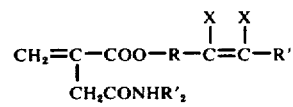

are particularly suited for grafting to polymers in fiber form, by techniques well known in the art to render the fibers non-burning, such as to fibers or textiles of the nylon, polyvinyl alcohol, regenerated cellulose, cotton, etc. They are particularly useful in this respect for cellulose fibers and fabric such as derived from rayon or cotton. One particularly useful method is to form a redox metal complex of the acidic cellulose, or, of the reaction product of cellulose with carbon bisulfide, and to graft the monomer directly to the cellulose.

Various methods of practicing the invention are illustrated by the following examples. These examples are intended merely to illustrate the invention and not in any sense to limit the manner in which the invention can be practiced. The parts and percentages recited therein and all through this specification, unless specifically provided otherwise, refer to parts by weight and percentages by weight.

EXAMPLE I

One hundred forty-five parts of 1,2,3-trichloropropene are added to a solution of 106 parts of sodium carbonate dissolved in 900 parts of water and the mixture refluxed for 10 hours. The water layer is then separated from the oily layer which is dried over anhydrous sodium carbonate, separated by filtration and distilled. There is obtained 115 parts of 2,3-dichloro-2- propene-1-ol, ClCH=CClCH₂OH, (I), b.p. 45°–46° C./1.5 mm; yield, 91%.

EXAMPLE II a. To 250 parts of carbon tetrachloride is added 56 parts of propargyl alcohol (A) and to this solution there is added slowly, at room temperature, a solution of 160 parts of bromine in 250 parts of carbon tetrachloride and allowed to react at room temperature for 2 hours, then the mixture is heated to 30°–40° C. for 2 hours. The mixture is then distilled to recover the carbon tetrachloride and the 2,3-dibromo-2-propene-1-ol, BrCH=CBrCH₂OH, (II), b.p. 51°–52° C./0.7 mm; yield, 93%.

b. Treatment of 1,2,3-tribromopropene with aqueous sodium carbonate by the procedure of Example I yields the same 2,3-dibromo-2-propene-1-ol.

EXAMPLE III

The reaction of 2-methyl-3-butyn-2-ol (B) with NaOCl under an inert atmosphere of nitrogen according to the procedure given in the Bull. soc. chim. (France), p. 1615 (1965), gives an 87% yield of 4-chloro-2-methyl-3-butyn-2-ol,

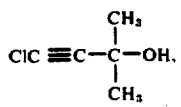

EXAMPLE IV

The reaction of 2-methyl-3-butyn-2-ol in water with Br₂ and NaOH by the procedure given in Ann. Chem. (Rome), 47, 118 (1957), yields 4-bromo-2-methyl-3-butyn-2-ol,

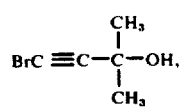

(IV), b.p. 92°–93° C./22 mm.

EXAMPLE V

The procedure of Example II(a) is repeated using instead of propargyl alcohol, one equivalent weight of the following acetylenic alcohols to obtain the halo-derivative corresponding to the alcohol used:

| Acetylenic Alcohol | | Dibromoethylene Derivative | |
|---|---|---|---|
| HC≡C—CH(CH₃)—OH | (C) | HC=C(Br)—C(Br)H—CH(CH₃)—OH | (V) |
| HC≡C—CH(C₂H₅)—OH | (D) | HC=C(Br)—C(Br)H—CH(C₂H₅)—OH | (VI) |
| HC≡C—CH(C₃H₇)—OH | (E) | HC=C(Br)—C(Br)H—CH(C₃H₇)—OH | (VII) |
| HC≡C—CH(C₄H₉)—OH | (F) | HC=C(Br)—C(Br)H—CH(C₄H₉)—OH | (VIII) |
| HC≡C—CH(C₈H₁₇)—OH | (G) | HC=C(Br)—C(Br)H—CH(C₈H₁₇)—OH | (IX) |
| HC≡C—CH(C₆H₅)—OH | (H) | HC=C(Br)—C(Br)H—CH(C₆H₅)—OH | (X) |
| HC≡C—C(CH₃)₂—OH | (B) | HC=C(Br)—C(Br)(CH₃)—C(CH₃)—OH | (XI) |
| HC≡C—C(CH₃)(C₂H₅)—OH | (I) | HC=C(Br)—C(Br)(CH₃)—C(C₂H₅)—OH | (XII) |
| HC≡C—C(CH₃)(C₄H₉)—OH | (J) | HC=C(Br)—C(Br)(CH₃)—C(C₄H₉)—OH | (XIII) |
| HC≡C—C(C₄H₉)₂—OH | (K) | HC=C(Br)—C(Br)(C₄H₉)—C(C₄H₉)—OH | (XIV) |
| H₃C—C≡C—CH₂OH | (L) | CH₃C(Br)=C(Br)—CH₂OH | (XV) |
| H₃C—C≡C—CH₂CH₂OH | (M) | CH₃C(Br)=C(Br)—CH₂CH₂OH | (XVI) |

-continued

| Acetylenic Alcohol | | Dibromoethylene Derivative | |
|---|---|---|---|
| $C_6H_5C≡C(CH_2)_{10}OH$ | (N) | $C_6H_5C(Br)=C(Br)-(CH_2)_{10}OH$ | (XVII) |
| $H_{41}C_{20}C≡C-CH_2OH$ | (O) | $H_{41}C_{20}C(Br)=C(Br)-CH_2OH$ | (XVIII) |
| $H_3CC≡C-CH_2CH(CH_3)-OH$ | (P) | $H_3CC(Br)=C(Br)-CH_2CH(CH_3)OH$ | (XIX) |
| $C_4H_9C≡C-CH_2OH$ | (Q) | $H_9C_4C(Br)=C(Br)-CH_2CHOH$ | (XX) |
| $C_6H_5C≡C-CH_2OH$ | (R) | $C_6H_5C(Br)=C(Br)-CH_2OH$ | (XXI) |
| $C_6H_5C≡C-CH_2CH_2OH$ | (S) | $C_6H_5C(Br)=C(Br)-CH_2CH_2OH$ | (XXII) |
| $C_6H_{11}C≡C-CH_2OH$ | (T) | $C_6H_{11}C(Br)=C(Br)-CH_2OH$ | (XXIII) |
| $C_6H_5C≡C-CH(CH_3)-OH$ | (U) | $C_6H_5C(Br)=C(Br)-CH(CH_3)OH$ | (XXIV) |
| $C_6H_5C≡C-C(CH_3)_2-OH$ | (V) | $C_6H_5C(Br)=C(Br)-C(CH_3)_2-OH$ | (XXV) |
| $ClC≡C-C(CH_3)_2-OH$ | (III) | $ClC(Br)=C(Br)-C(CH_3)_2-OH$ | (XXVI) |
| $BrC≡C-C(CH_3)_2-OH$ | (IV) | $BrC(Br)=C(Br)-C(CH_3)_2-OH$ | (XXVII) |
| $C_{10}H_7C≡CCH_2OH$ | (W) | $C_{10}H_7C(Br)=C(Br)-CH_2OH$ | (XXVIII) |

EXAMPLE VI a. Into a solution of 56 parts of propargyl alcohol and 0.1 part of iodine in 300 parts of tetrachloroethylene is slowly passed chlorine gas while exposed to an ultraviolet lamp until 70 parts of chlorine are reacted. The halogenated product is then recovered by distillation and the majority of the product is identical to the 2,3-dichloro-2-propene-1-ol of Example I.

b. In a similar manner there is prepared

$CH_3C(Cl)=C(Cl)-CH_2OH$ (XXIX),

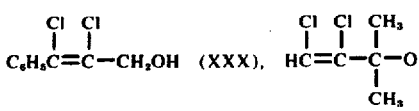

$C_6H_5C(Cl)=C(Cl)-CH_2OH$ (XXX), $HC(Cl)=C(Cl)-C(CH_3)-OH$ (XXXI), $ClC(Cl)=C(Cl)-C(CH_3)-OH$ (XXXII),

$Cl_2C=C(Cl)-CH_2OH$ (XXXIII), and $Br_2C=C(Br)-CH_2OH$ (XXXIV).

EXAMPLE VII

A mixture of 127 parts of 2,3-dichloropropene-1-ol, 144 parts mono(dimethyl)amide of maleic acid, 400 parts of toluene, 0.50 parts of toluene sulfonic acid and 1 part of tertiary-butyl catechol are reacted at reflux in a Dean-Stark apparatus under a nitrogen atmosphere until about 18 parts of water are collected in the trap. Then a saturated aqueous solution of sodium carbonate is added to the reaction mixture to neutralize the acid, the aqueous layer is separated from the mixture which is again washed with distilled water, the benzene layer is then separated, dried over anhydrous sodium carbonate and filtered. The filtrate is distilled at reduced pressure to remove the benzene and to remove the ester. There is obtained a 90% yield of

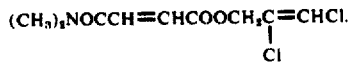

Analysis for chlorine gives a value of 28.0% which is in close agreement with the theoretical value.

EXAMPLE VIII

The procedure of Example VII is repeated except that instead of the 2,3-dichloropropene-1-ol, there is used 200 parts of 2,3-dibromopropene-1-ol and there is obtained

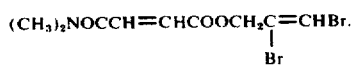

Analysis gives a value of 46.5% bromine which is in good agreement with the calculated value.

EXAMPLE IX

The procedures of Examples VII and VIII are repeated a number of times except that the maleic monoamide is replaced with equivalent amounts respectively of the following monoamides:

a. fumaric monoamide
b. fumaric mono(dimethyl)amide
c. itaconic mono(diethyl)amide
d. maleic mono(diallyl)amide
e. itaconic mono(allyl)amide
f. monochlorofumaric mono(dimethyl)amide
g. aconitic bis(ethylamide)
h. aconitic mono(ethylamide) mono(ethyl ester)
i. dibromomaleic mono(ethyl)amide
j. fumaric mono(methyl)amide
k. maleic mono(ethanol)amide
l. maleic mono(diethanol)amide
m. itaconic mono(phenyl)amide
n. fumaric mono(cyclohexyl)amide.

In each case a good yield of the corresponding ester-amide product is obtained and analysis for halogen content checks closely with the theoretical value.

EXAMPLE X

To a mixture of 800 parts of dry benzene, 153 parts of fumaryl dichloride (ClOCCH=CHCOCl) and 202 parts of triethylamine cooled to 5° C. is added slowly with stirring 127 parts of 2,3-dichloropene-1-ol over a period of 1 and one-half hours. Then 45 parts of dimethyl amine is added slowly with stirring over a period of 1 and one-half hours. The mixture is then filtered to remove the triethylamine hydrochloride and hexane is added to the filtrate until it becomes turbid. The solution is filtered, decolorized with charcoal and the solvent removed from the filtrate at 15 mm Hg pressure, leaving as the product $(CH_3)_2NOCCH=CHCOOCH_2CCl=CHCl$. The chlorine analysis checks closely with the theoretical value.

When 167 parts of itaconyl dichloride are used instead of fumaryl dichloride, there is obtained the ester,

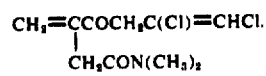

EXAMPLE XI

Esterification of the dihalo alcohols V to XXXIV shown in Example V by the procedure of Example X yields the corresponding fumaric ester-amides of the formula:

EXAMPLE XII

To a mixture of 800 parts of dry benzene, 127 parts of 2,3-dichloropropene-1-ol and 101 parts of triethylamine cooled to 5° C. is added slowly with stirring 161 parts of fumaryl amide chloride, $(CH_3)_2NOCCH=CHCOCl$, over a period of 1 and one-half hours. The mixture is then filtered to remove the triethylamine hydrochloride and hexane is added to the filtrate until it becomes turbid. The solution is filtered, decolorized with charcoal, and the solvent removed from the filtrate at 15 mm Hg pressure, leaving the product $(CH_3)_2NOCCH=CHCOOCH_2CCl=CHCl$.

EXAMPLE XIII a. To 50 parts of

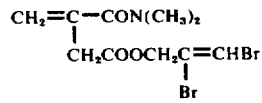

in a glass tube is added 0.5 parts of benzoyl peroxide and the mixture stirred at 25° C. until the radical initiator is dissolved; the tube is then sealed under nitrogen and heated at 80° C. for 24 hours and at 100° C. for 18 hours. There is obtained a clear, almost water-white rubbery polymer. When a sample of the polymer is ignited it does not continue to burn. The polymer is readily soluble in chloroform, ethylene dichloride and benzene, and has a repeating unit structure of the formula

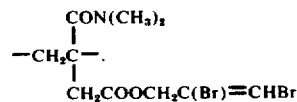

b. Fifty parts of

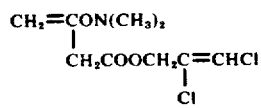

is polymerized as in Example XIII(a). When ignite the polymer continues to burn with difficulty, but when the polymerization is repeated by first adding five parts of trimethyl phosphite to the monomer and the mixture polymerized, the resulting polymer, when ignited, does not continue to burn. In contrast, when a mixture of 50 parts of methyl itaconate and 5 parts of trimethyl phosphite is polymerized, the resulting polymer continues to burn when ignited.

EXAMPLE XIV a. A mixture of 94 parts of methyl methacrylate and six parts of

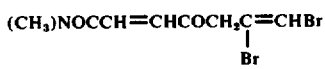

is copolymerized by the procedure of Example XIII(a) and the resulting copolymer is self-extinguishing when ignited. The copolymer is soluble in chloroform, benzene and toluene.

b. A mixture of 92 parts of methyl methacrylate and eight parts of

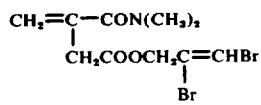

is copolymerized by the procedure of Example XIII(a) and a self-extinguishing copolymer is obtained.

c. Copolymerizatin of monomers V to XXXIV by the procedure of Example XIII (a) yield soluble, self-extinguishing copolymers.

EXAMPLE XV l

The procedure of Example XIV(b) is repeated six times using instead of methyl methacrylate, 92 parts of each of the following: methyl acrylate, styrene, acrylonitrile, vinyl acetate, beta-cyano-ethyl methacrylate, vinyl chloroacetate, and in all cases self-extinguishing copolymers are obtained.

EXAMPLE XVI

The following unsaturated polyesters are prepared, as illustrative of the class of unsaturated alkyd resins, by heating the ingredients in an inert nitrogen or carbon dioxide atmosphere.

| Alkyd Resin A Ethylene glycol maleate | |
|---|---|
| | (parts by weight) |
| Ethylene glycol | 68.2 |
| Maleic anhydride | 98.0 |

The components are mixed and slowly heated in the course of 1 hour to 190° C. and held at this temperature for 4 to 6 hours, until the acid number is reduced to below 40.

| Alkyd Resin B Ethylene glycol-maleate-phthalate | |
|---|---|
| | (parts by weight) |
| Ethylene glycol | 68.2 |
| Maleic anhydride | 49.0 |
| Phthalic anhydride | 74.0 |

The compounds are mixed and heated according to the procedure given above for alkyd resin A.

| Alkyd Resin C | |
|---|---|
| | (parts by weight) |
| Propylene glycol | 68.2 |
| Maleic anhydride | 65.0 |
| Tetrabromophthalic anhydride | 140.0 |

The compounds are mixed and heated slowly to 190° C. and held at this temperature for 3 hours, then raised to 200° C. until the acid number is at least 40 or lower.

EXAMPLE XVII a. To each of 50 parts of alkyd resin A, B and C respectively are added 50 parts of

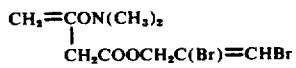

and 0.20 parts of tertiary butyl hydroperoxide; then fiberglass mats are impregnated with these solutions according to procedures well known in the art to 45% resin contents. A 3-ply laminate is prepared and placed between two layers of polyethylene film and cured for 2 hours at 100° C. and 4 hours at 125° C. The cured laminates when tested for flame-resistant properties by A.S.T.M. Method D-635-44 are found to be non-burning and self-extinguishing.

b. The procedure of Example XVII(a) is repeated but 30 parts of the ester-amide monomer is replaced in four separate tests by 30 parts styrene, methyl methacrylate, vinyl acetate and triallyl cyanurate respectively, and in all cases non-burning, self-extinguishing laminates are obtained.

c. The procedure of Example XVII(a) is repeated a number of times using instead of the

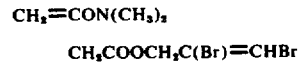

an equivalent amount respectively of the following monomers:

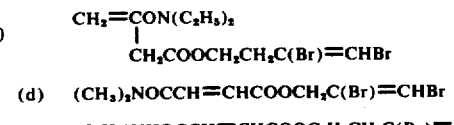

(d) $(CH_3)_2NOCCH=CHCOOCH_2C(Br)=CHBr$ (e) $(C_6H_5)NHOCCH=CHCOOC_6H_4CH_2C(Br)=CHBr$

In each case, a self-extinguishing non-burning laminate is obtained

EXAMPLE XVIII

A skein of 40 parts of cotton thread is placed in an aqueous solution containing 50 parts of NaOH, 5.0 parts of $CS_2$ and 0.10 part of sodium dodecylbenzenesulfonate and allowed to stand for 30 minutes. The skein is then removed, washed thoroughly with distilled water and immersed in 1000 parts of solution containing 0.2 part of $FeSO_4.(NH_4)_2SO_4$ and 3.0 parts of tetrabis-hydroxymethyl phosphonium chloride for 10 minutes. The skein is then washed with distilled water and suspended in 2000 parts of an emulsion containing 24 parts of

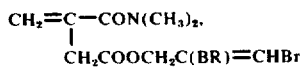

0.2 part of sodium dodecylbenzenesulfonate and 3.0 parts of hydrogen peroxide and the mixture heated with agitation at 60°–70° C. under nitrogen for 3 hours following which the skein is removed, washed with water and dried. There is obtained 62.71 parts of grafted threads, which when suspended and the ends ignited, are self-extinguishing when the source of flame is removed.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A polymerization product of an ester-amide of an α,β-ethylenic unsaturated polycarboxylic acid selected from the class consisting of maleic, fumaric, methyl and dimethyl maleic and fumaric, mono and dichloromaleic and fumaric, dibromo maleic and fumaric, itaconic and aconitic acids, one of the acid groups therein being esterified by a halogenated alcohol having the formula

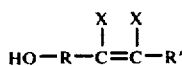

wherein
R is a divalent hydrocarbon radical having 1–10 carbon atoms therein,
R' is selected from the class of H and monovalent hydrocarbon radicals of 1–20 carbon atoms, and
X is bromine or chlorine,
the second acid group being converted to an amide group of the formula —CONR"$_2$ wherein R" is a group selected from the class consisting of hydrogen and hydrocarbon groups of 1–20 carbon atoms and derivatives of said hydrocarbon groups in which derivative there is only one derivative group selected from the class consisting of —OH or —NH$_2$, and when the polycarboxylic acid is aconitic acid, the third acid group is similarly amidified or unesterified or esterified with an alcohol selected from the class consisting of methyl, ethyl, propyl, amyl, hexyl, stearyl, benzyl, vinyl, allyl, methallyl, propargyl, butynyl, or crotyl, beta-N,N-dimethylaminoethyl, cyclohexyl, beta-hydroxyethyl, beta-hydroxypropyl, and

alcohol.

2. A polymerization product of claim 1 having the repeating unit structure

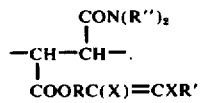

3. A polymerization product of claim 1 having the repeating unit structure

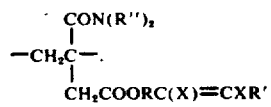

4. A polymerization product of claim 1 having the repeating unit structure

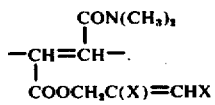

5. A polymerization product of claim 1 having the repeating unit structure

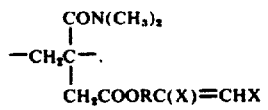

* * * * *